US010671450B2

(12) United States Patent
Street

(10) Patent No.: US 10,671,450 B2
(45) Date of Patent: Jun. 2, 2020

(54) COALESCING EVENTS FRAMEWORK

(71) Applicant: Facebook, Inc., Menlo Park, CA (US)

(72) Inventor: Andrew Lankes Street, Midlothian, VA (US)

(73) Assignee: Facebook, Inc., Menlo Park, CA (US)

( * ) Notice: Subject to any disclaimer, the term of this patent is extended or adjusted under 35 U.S.C. 154(b) by 307 days.

(21) Appl. No.: 15/585,071

(22) Filed: May 2, 2017

(65) Prior Publication Data

US 2018/0321990 A1    Nov. 8, 2018

(51) Int. Cl.
*G06F 9/54*    (2006.01)
*G06F 3/0488*    (2013.01)

(52) U.S. Cl.
CPC .......... *G06F 9/542* (2013.01); *G06F 3/04883* (2013.01)

(58) Field of Classification Search
CPC ...................................... G06F 9/542
USPC ........................................ 719/318
See application file for complete search history.

(56) References Cited

U.S. PATENT DOCUMENTS

| | | | | |
|---|---|---|---|---|
| 8,760,424 | B2 * | 6/2014 | Laubach | G06F 3/0416 345/173 |
| 9,477,649 | B1 | 10/2016 | Davidson et al. | |
| 2006/0033743 | A1 | 2/2006 | Morein et al. | |
| 2009/0116732 | A1 | 5/2009 | Zhou et al. | |
| 2014/0139512 | A1 | 5/2014 | Piazza et al. | |
| 2015/0077345 | A1 * | 3/2015 | Hwang | G06F 3/0412 345/173 |
| 2017/0221242 | A1 | 8/2017 | Street | |

OTHER PUBLICATIONS

Final Office Action dated Jul. 27, 2017, for U.S. Appl. No. 15/012,666 by Street, A., filed Feb. 1, 2016.
Non-Final Office Action dated Feb. 9, 2017, for U.S. Appl. No. 15/012,666 by Street, A., filed Feb. 1, 2016.
U.S. Appl. No. 15/012,666, by Street, A., et al., filed Feb. 1, 2016.
U.S. Appl. No. 15/200,445 by Street, A., et al., filed Jul. 1, 2016.
U.S. Appl. No. 15/587,341 by Street, A., et al., filed May 4, 2017.
Non-Final Office Action dated Nov. 16, 2017 for U.S. Appl. No. 15/012,666 by Street, A., filed Feb. 1, 2016.
Advisory Action dated Oct. 5, 2017 for U.S. Appl. No. 15/012,666 by Street, A., filed Feb. 1, 2016.

* cited by examiner

*Primary Examiner* — Andy Ho
(74) *Attorney, Agent, or Firm* — FisherBroyles, LLP

(57) ABSTRACT

Coalescing of events associated with an action is disclosed. In particular, the systems and methods can coalesce one or more events associated with an action to optimize processing and reduce jitters. The system first determines if the action can be coalesced. The system then determines a list of events associated with the action that can be coalesced. From that list, the system determines the optimum set(s) of events that are coalesced to minimize jitters. The optimum set(s) of events are then associated with the action, and executed. As a result, the processing of events triggered by an action is optimized and jitters in the resulting user-experience of the user are minimized.

20 Claims, 4 Drawing Sheets

COALESCING EVENTS FRAMEWORK

BACKGROUND

Web pages displayed at a user's device are expected to offer smooth interaction with minimal delay in rendering. That is, web pages should not only load quickly, but also run well. Further, a user should be able to scroll a web page without experiencing jitters to breaks in viewing experience. Most devices today refresh their screens 60 times a second. If the web page being displayed contains an animation or a transition, or the user is scrolling the pages, the browser needs to match the device's refresh rate and put up 1 new picture, or frame, for each of those screen refreshes. Thus, each frame has a budget of about 16 ms (1 second/60=16.67 ms). When a user's device fails to meet this budget (for example, when the processing speed of the device is slow), the frame rate drops, and the content judders on screen. This is often referred to as jank, and it negatively impacts the user's experience.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

DETAILED DESCRIPTION

Overview

Figure 1:
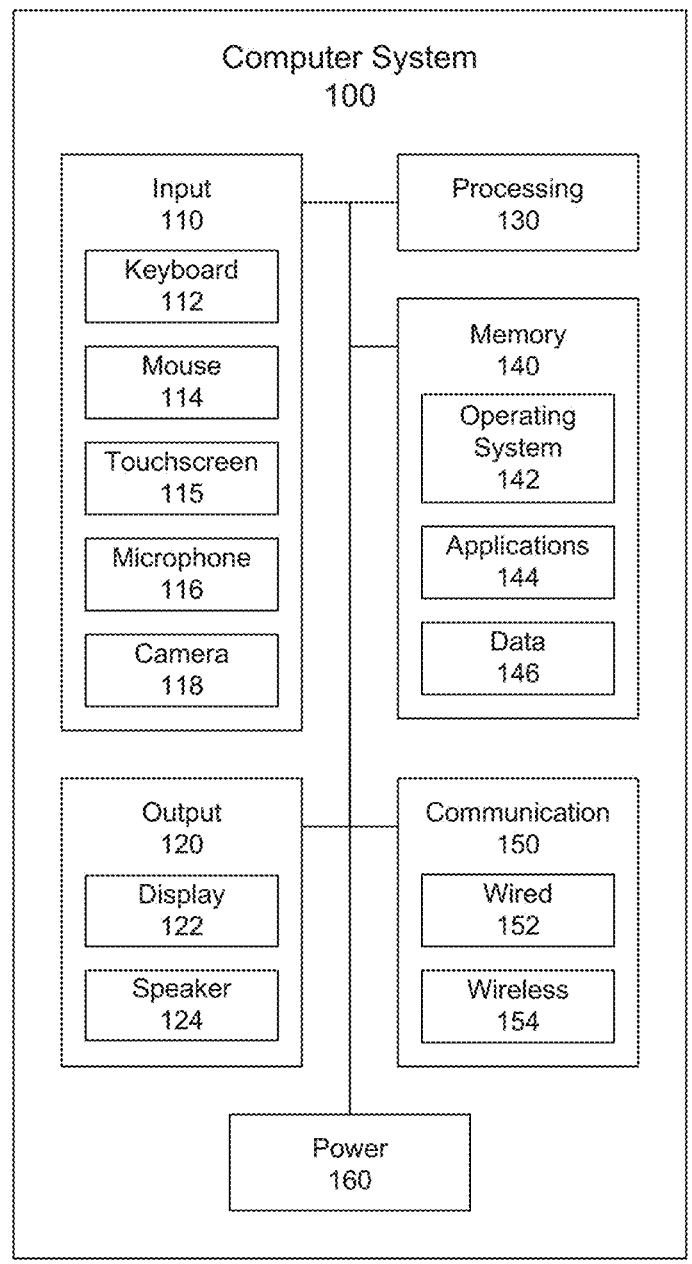
FIG. 1 is a block diagram showing some of the components typically incorporated in computer systems and other devices on which an asynchronous UI framework can be implemented.

When an application component starts on a device, the operating system typically starts a new process for the application with a thread of execution. All components of the same application can run in the same process and thread (called the "main" thread). The main thread is in charge of dispatching events to the appropriate user interface widgets, including drawing events. The main thread is also called the UI thread. All components that run in the same process are typically instantiated in the UI thread, and system calls to each component are dispatched from that thread. As a result, methods that respond to system callbacks (e.g., methods to report user actions or a lifecycle callback method) always run in the UI thread of the process.

When a user interacts with an application, the user's action can trigger multiple events. For example, when the user touches a button on the screen, a touch event can be triggered. A mouse click first triggers mousedown, when the button is pressed, then mouseup and click when it's released. When a user presses the mouse-down button and moves the mouse pointer to another location on the screen, several other events (e.g., mousedown, multiple mousemoves, mouseup, and click) may be triggered. When a user action is detected, the application's UI thread can dispatch each of the triggered events to the application (e.g., widget) and post a request to the event queue. After the events are handled, the UI thread can de-queue the request and notifies the application widget that it should redraw itself.

When an application performs intensive work in response to user interaction (e.g., when it has to handle several events), this model can yield poor performance. For example, if the user presses the mousedown button (or touches a point on a touch surface), moves the mouse pointer from one end of the screen to the other (or moves the touch point along the touch surface), and then releases the mousedown button (or removes the touch point from the touch surface), the UI thread has to process the following events: mousedown (or touchstart), multiple mousemoves (or touchmoves) for each point between the mousedown and the mouseup, and a mouseup (or touchend). If the processor handling the UI thread is slow, handling multiple events in a short time frame can result in jitters. In some cases, handling a large number of events can block the whole UI. When the thread is blocked, no events can be dispatched, including drawing events. From the user's perspective, the application appears to hang. If the UI thread is blocked for more than a few seconds (e.g., 5 seconds), the user is presented with an "application not responding" dialog. The user might then decide to quit the application and even uninstall it if they are dissatisfied with the performance. This disclosure is directed to improve the responsiveness of an application's UI and improve a user's experience.

The present disclosure describes an architecture that can enable coalescing certain events to increase the efficiency of processing a user action. In some implementations, certain events or types of events may be used to indicate that the events can be coalesced. When a user action triggers one or more events, the processor can first check if any of the events are marked as "can be coalesced." Then, the events that can be coalesced are handled together in a manner to reduce the processing requirements for handling the event. In this way, the efficiency and responsiveness of an application can be enhanced.

DESCRIPTION OF FIGURES

The following description provides certain specific details of the illustrated examples. One skilled in the relevant art will understand, however, that embodiments can be practiced without many of these details. Likewise, one skilled in the relevant art will also understand that the present disclosure can include many other obvious features not described in detail herein. Additionally, some well-known structures or functions may not be shown or described in detail below, to avoid unnecessarily obscuring the relevant descriptions of the various examples.

FIG. 1 is a block diagram showing some of the components typically incorporated in computing systems and other devices on which a coalescing events framework can be implemented. In the illustrated embodiment, the computer system 100 includes a processing component 130 that controls operation of the computer system 100 in accordance with computer-readable instructions stored in memory 140. The processing component 130 may be any logic processing unit, such as one or more central processing units (CPUs), graphics processing units (GPUs), digital signal processors (DSPs), field-programmable gate arrays (FPGAs), application-specific integrated circuits (ASICs), etc. The processing component 130 may be a single processing unit or multiple processing units in an electronic device or distributed across multiple devices. Aspects of the system can be embodied in a special purpose computing device or data processor that is specifically programmed, configured, or constructed to perform one or more of the computer-executable instructions explained in detail herein. Aspects can also be practiced in distributed computing environments in which functions are performed by local and/or remote processing devices that are linked through a communications network, such as a local area network (LAN), wide area network (WAN), or the Internet.

The processing component 130 is connected to memory 140, which can include a combination of temporary and/or permanent storage, and both read-only memory (ROM) and writable memory (e.g., random access memory or RAM, CPU registers, and on-chip cache memories), writable non-volatile memory such as flash memory or other solid-state memory, hard drives, removable media, magnetically or optically readable discs and/or tapes, nanotechnology memory, synthetic biological memory, and so forth. A memory is not a propagating signal divorced from underlying hardware; thus, a memory and a computer-readable storage medium do not refer to a transitory propagating signal per se. The memory 140 includes data storage that contains programs, software, and information, such as an operating system 142, application programs 144, and data 146. Computer system 100 operating systems 142 can include, for example, Windows®, Linux®, Android™, iOS®, and/or an embedded real-time operating system. The application programs 144 and data 146 can include software and databases—including data structures, database records, other data tables, etc.—configured to control computer system 100 components, process information (to, e.g., coalesce events), communicate and exchange data and information with remote computers and other devices, etc. In a distributed computing environment, program modules and data can be located in both local and remote memory storage devices.

In some embodiments, the memory 140 includes program memory that contains programs and software, and data memory that includes configuration data, settings, preferences, files, documents, etc. that may be accessed by instructions from the program memory or by a component of the computing system 100. Program memory can include modules of the operating system 142 and application programs 144, such as a view management system and view rendering software for displaying and modifying views according to the present disclosure, and communication software for transmitting and receiving data by various channels and protocols via the communication components 150.

The computer system 100 can include input components 110 that receive input from user interactions and provide input to the processor 130, typically mediated by a hardware controller that interprets the raw signals received from the input device and communicates the information to the processor 130 using a known communication protocol. Examples of an input component 110 include a keyboard 112 (with physical or virtual keys), a pointing device (such as a mouse 114, joystick, dial, or eye tracking device), a touchscreen 115 that detects contact events (e.g., when it is touched by a user), a microphone 116 that receives audio input (e.g., for systems implementing speech recognition as a method of input by the user), and a camera 118 for photograph and/or video capture. The computer system 100 can also include various other input components 110 such as GPS or other location determination sensors, motion sensors, wearable input devices with accelerometers (e.g., wearable glove-type or head-mounted input devices), biometric sensors (e.g., a fingerprint sensor), light sensors (e.g., an infrared sensor), card readers (e.g., a magnetic strip reader or a memory card reader), and so on.

The processor 130 can also be connected to one or more various output components 120, e.g., directly or via a hardware controller. The output devices can include a display 122 on which text and graphics are displayed. The display 122 can be, for example, an LCD, LED, or OLED display screen (such as a desktop computer screen, handheld device screen, or television screen), an e-ink display, a projected display (such as a heads-up display device), and/or a display integrated with a touchscreen 115 that serves as an input device as well as an output device that provides graphical and textual visual feedback to the user. The output devices can also include a speaker 124 for playing audio signals, haptic feedback devices for tactile output such as vibration, etc. In some implementations, the speaker 124 and the microphone 116 are implemented by a combined audio input-output device.

In the illustrated embodiment, the computer system 100 further includes one or more communication components 150. The communication components can include, for example, a wired network connection 152 (e.g., one or more of an Ethernet port, cable modem, FireWire cable, Lightning connector, universal serial bus (USB) port, etc.) and/or a wireless transceiver 154 (e.g., one or more of a Wi-Fi transceiver; Bluetooth transceiver; near-field communication (NFC) device; wireless modem or cellular radio utilizing GSM, CDMA, 3G and/or 4G technologies; etc.). The communication components 150 are suitable for communication between the computer system 100 and other local and/or remote computing devices, directly via a wired or wireless peer-to-peer connection and/or indirectly via a communication link and networking hardware, such as switches, routers, repeaters, electrical cables and optical fibers, light emitters and receivers, radio transmitters and receivers, and the like (which can include the Internet, a public or private intranet, a local or extended Wi-Fi network, cell towers, the plain old telephone system (POTS), etc.). The computer system 100 further includes power 160, which can include battery power and/or facility power for operation of the various electrical components associated with the computer system 100.

FIG. 1 and the discussion herein provide a brief, general description of a suitable computing environment in which a system providing a coalescing events framework can be implemented. Although not required, aspects of the system are described in the general context of computer-executable instructions, such as routines executed by a general-purpose computer, e.g., a mobile device, a server computer, or a personal computer. Those skilled in the relevant art will appreciate that the system can be practiced using various communications, data processing, or computer system configurations, e.g., hand-held devices (including tablet computers, personal digital assistants (PDAs), and mobile phones), laptop computers, wearable computers, vehicle-based computers, multi-processor systems, microprocessor-based consumer electronics, set-top boxes, network appliances, mini-computers, mainframe computers, virtual computing platforms, distributed computing environments that include any of the above systems or devices, etc. The terms "computer" and "electronic device" are generally used interchangeably herein, and refer to any such data processing devices and systems. While computer systems configured as described above are typically used to support the operation of a system implementing a coalescing events framework, one of ordinary skill in the art will appreciate that embodiments may be implemented using devices of various types and configurations, and having various components.

Figure 2:
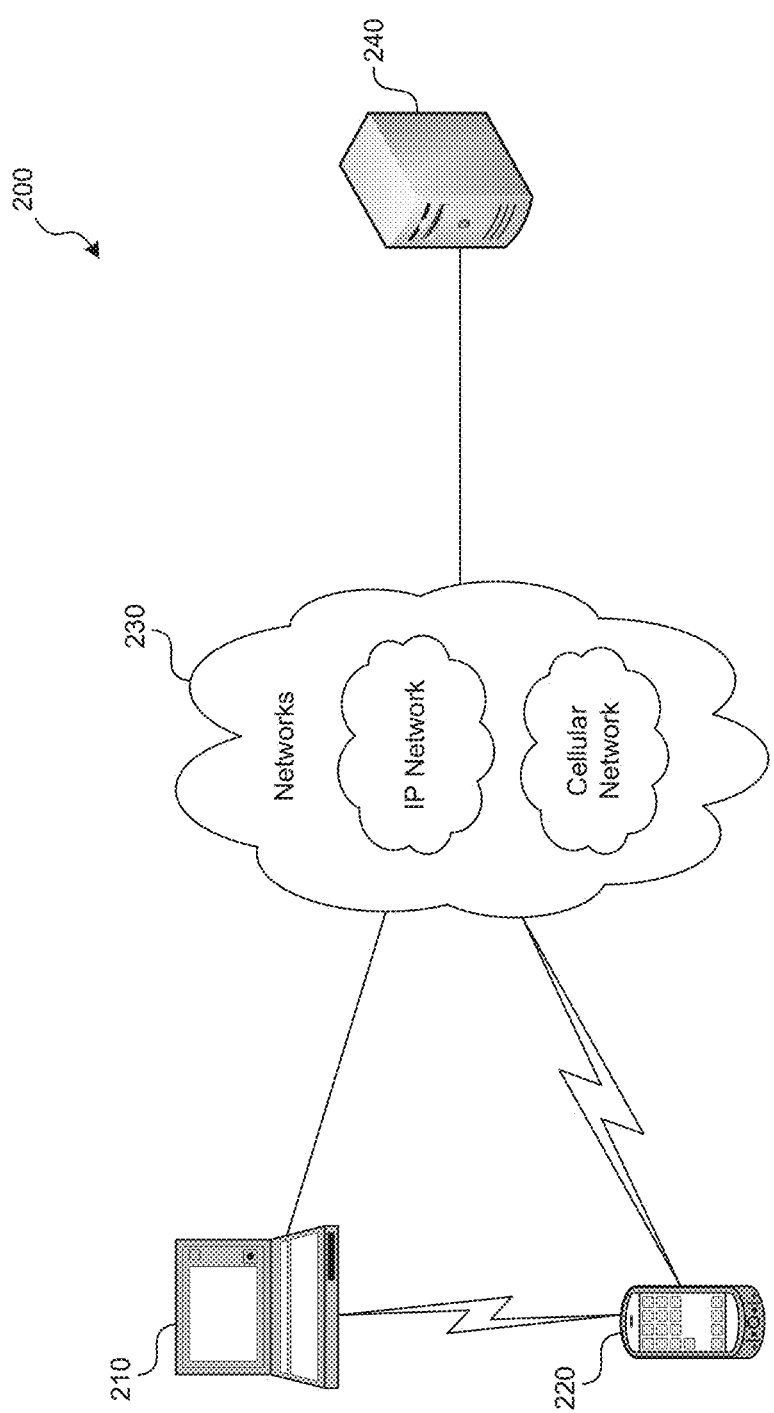
FIG. 2 is a system diagram illustrating an example of a computing environment in which an asynchronous UI framework can be utilized.

FIG. 2 is a system diagram illustrating an example of a computing environment 200 in which a coalescing events system can be utilized. As illustrated in FIG. 2, a coalescing events system can operate on various computing devices, such as a computer 210, mobile device 220 (e.g., a mobile phone, tablet computer, mobile media device, mobile gaming device, wearable computer, etc.), and other devices capable of receiving user inputs (e.g., such as a set-top box or vehicle-based computer). Each of these devices can include various input mechanisms (e.g., microphones, keypads, cameras, and/or touch screens) to receive user interactions (e.g., voice, text, gesture, and/or handwriting inputs). These computing devices can communicate through one or more wired or wireless, public or private, networks 230 (including, e.g., different networks, channels, and protocols) with each other and with a system 240 that, e.g., coordinates display element (e.g., view hierarchy) data structure information across user devices and/or performs computations regarding views. System 240 can be maintained in a cloud-based environment or other distributed server-client system. As described herein, user input (e.g., trace input via a virtual keyboard) can be communicated between devices 210 and 220 and/or to the system 240. In addition, information about the user or the user's device(s) 210 and 220 (e.g., the current and/or past location of the device(s), views displayed on each device, device characteristics, and user preferences and interests) can be communicated to the system 240. In some implementations, some or all of the system 240 is implemented in user computing devices such as devices 210 and 220.

Figure 3:
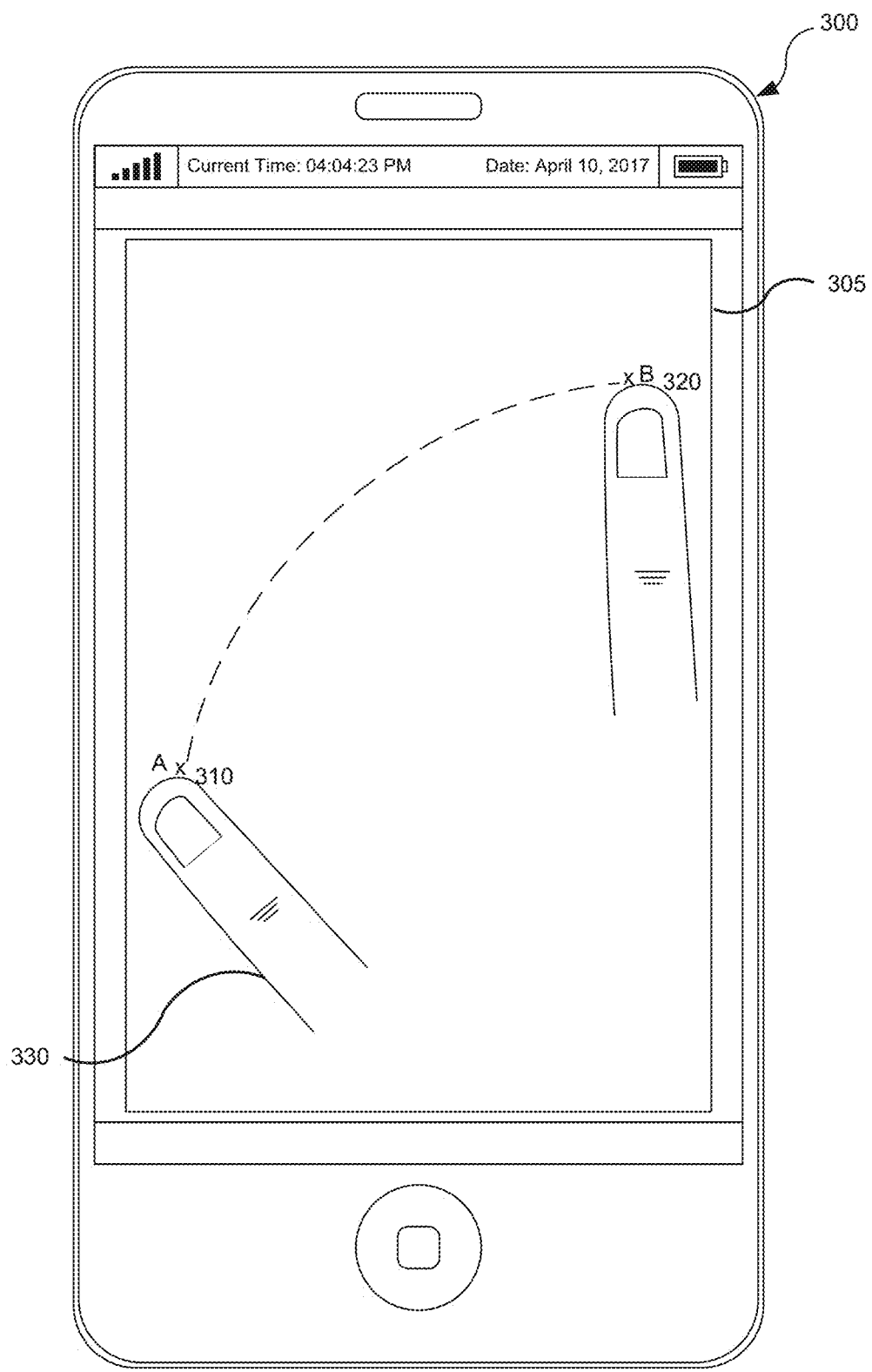
FIG. 3 is a display diagram illustrating coalescing events processing in accordance with some embodiments.

FIG. 3 is a display diagram illustrating coalescing events processing in accordance with some embodiments. A user can interact with an application displayed on a screen 305 of a user's device 300. For example, the user can use a finger 330 or stylus to interact with an input component (e.g., a touchscreen 305). The user can touch the screen at point A and then move the finger to point B. This user action can trigger a touchstart event when the user first touches the screen at point A. Then, several touchmove events are triggered to capture the movement of the user's finger from point A to point B. Once the user's finger reaches point B, a touchend event can be triggered. In a traditional system, the UI thread processes each of the triggered events during a frame, and renders the change in the application's UI. However, as discussed above, if the speed of the processor handling these events is slow, the resulting display can produce jitters. The present disclosure provides a solution for reducing jitters by coalescing the multiple events triggered by the user's touch. For example, when the user moves his/her finger from point A to point B, instead of tracking the entire trajectory of the finger-move (and thus process touchmove events for each point on the trajectory between point A and point B), the coalescing events framework can capture the starting point (point A) and the ending point (point B) and then use one or more algorithms or mathematical functions (e.g., interpolation) to determine the intermediate points. A parameter can be used to determine the number of touchmove events for the computed intermediate points (typically, the parameter value is less than the number of touchmove events triggered with traditional processing). In this way, the coalescing events framework reduces the number of events handled by the processor, thus reducing the jitters that can result from UI processing.

Figure 4:
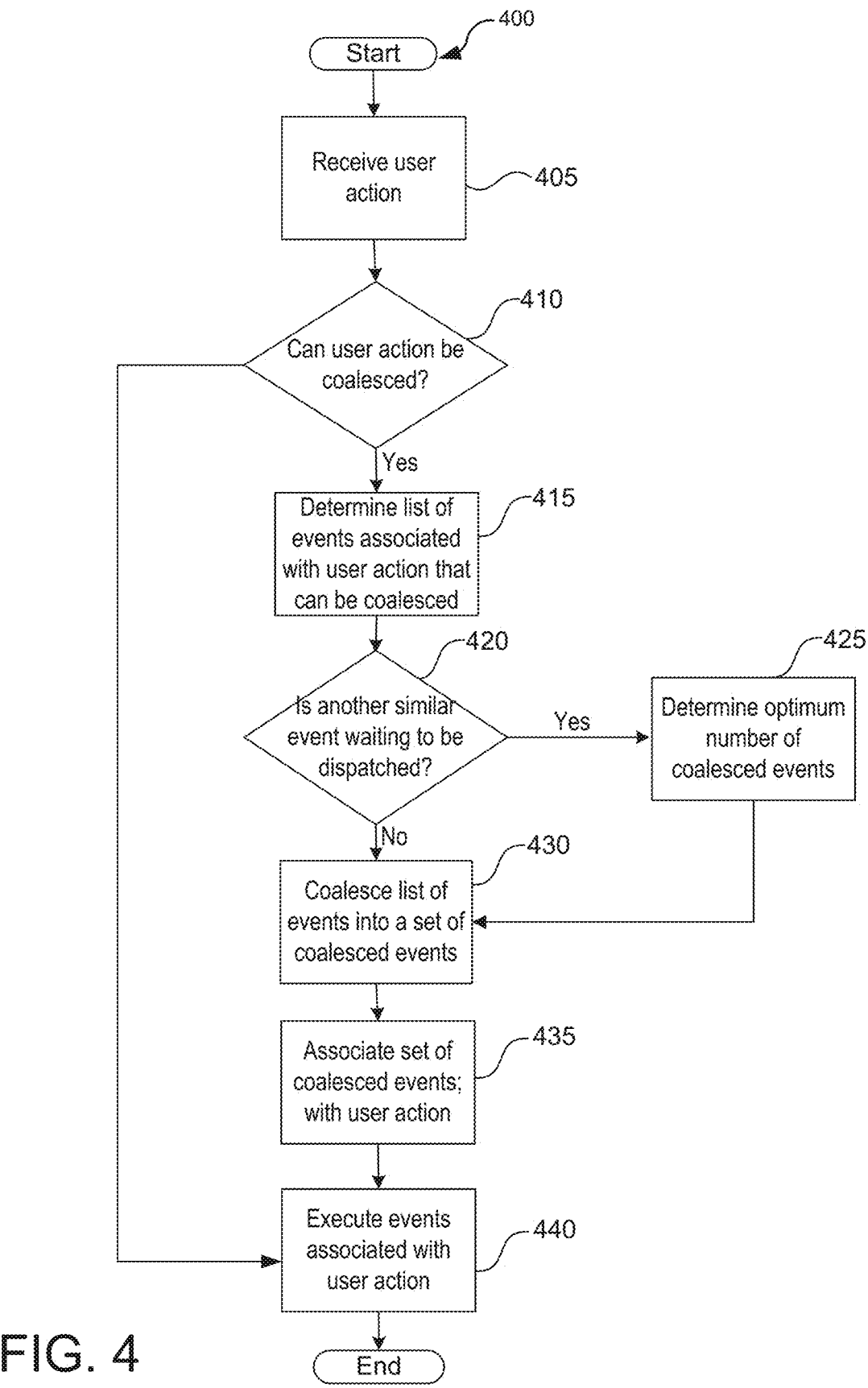
FIG. 4 is a data flow diagram illustrating a process for a computer system to coalesce events in accordance with some embodiments.

FIG. 4 is a data flow diagram illustrating a process for a computer system (e.g., the computing system 100 of FIG. 1) to coalesce events in accordance with some embodiments. The process begins at block 405 upon receiving a user action for processing (e.g., user action illustrated in FIG. 3) and proceeds to block 410. At block 410, the process 400 determines if the user action can be coalesced. An action can be designated to indicate that the events associated with it can be coalesced. For example, an action can be associated with an annotation, tag, etc. to indicate that the events associated with the action can be coalesced. In some embodiments, the process 400 may access a list of actions to determine if the events associated with the action can be coalesced. In some embodiments, the process 400 can evaluate past actions to determine if the current action can be coalesced. For example, if it was previously determined that the action could be coalesced, then the action can be designated as a coalesced type of action. Actions can be designated to indicate that the events associated with it can be coalesced on an application basis, a specific user interface per application basis, a function per application basis, etc.

If the process 400 determines that the user action cannot be coalesced, it proceeds to block 440 and executes the events associated with the action. However, if the process 400 determines that the user action can be coalesced, it proceeds to block 415. At block 415, the process 400 determines a list of events associated with the action that can be coalesced. Some or all events associated with the action can be coalesced. Similar to actions, events can be associated with an annotation, tag, etc. to indicate that the event can be coalesced. Certain events can be considered as a coalesced type of event by default. In some embodiments, the process 400 may access a list of events to determine if the event can be coalesced. In some embodiments, the process 400 can evaluate past events to determine if the current event(s) can be coalesced. For example, if it was previously determined that certain events associated with an action could be coalesced, then those events can be designated as a coalesced type of events for the action. Events can be designated to indicate that it can be coalesced on an application basis, a specific user interface per application basis, a function per application basis, etc. For example, in the user action illustrated in FIG. 3, process 400 can coalesce the multiple touchmove events into a single touchmove event.

Once the process 400 determines that the list of events that can be coalesced, it can access the list of events that are awaiting dispatch. For example, another thread can asynchronously populate events for dispatch from the hardware. When a new event that can be coalesced comes in, the process 400 checks, at block 420, if a similar event is awaiting dispatch. For example, the process 400 can determine that an event that can be coalesced and an event awaiting dispatch are similar based on the type of event (e.g., mousemove, touchmove, etc.). If a similar event is awaiting dispatch, the process 400, at block 425, can determine the optimum number of coalesced events. In some embodiments, customized logic can be used to coalesce the similar events. For example, the process 400 can coalesce similar touchmove events by selecting the most recent touchmove event. This can help improve the performance of a UI framework since if an event (e.g., a mousemove event) is taking a long time to process, then coalescing the multiple mousemove events can reduce congestion.

In some embodiments, the process 400 can group the events into a predetermined number of sub-groups to optimize processing. For example, the process 400 can group the events in the list into two sub-groups to optimize processing of the events. In some embodiments, the process 400 may use machine learning techniques to determine the optimum number of coalesced events. For example, the process 400 can evaluate processing of past events to determine the type of events and optimum number of events that can be coalesced to increase efficiency of processing. Then, at block 430, the list of events can be coalesced into one or more sets of coalesced events. The set(s) of coalesced events can then be associated with the action, at bock 435. The process 400 can, at block 440, execute the events, including the set(s) of coalesced events associated with the action.

REMARKS

The above description and drawings are illustrative and are not to be construed as limiting. Numerous specific details are described to provide a thorough understanding of the disclosure. However, in some instances, well-known details are not described in order to avoid obscuring the description. Further, various modifications may be made without deviating from the scope of the implementations. Accordingly, the implementations are not limited except as by the appended claims.

Reference in this specification to "one implementation," "an implementation," or "some implementations" means that a particular feature, structure, or characteristic described in connection with the implementation is included in at least one implementation of the disclosure. The appearances of the phrase "in some implementations" in various places in the specification are not necessarily all referring to the same implementation, nor are separate or alternative implementations mutually exclusive of other implementations. Moreover, various features are described which may be exhibited by some implementations and not by others. Similarly, various requirements are described which may be requirements for some implementations but not for other implementations.

The terms used in this specification generally have their ordinary meanings in the art, within the context of the disclosure, and in the specific context where each term is used. Terms that are used to describe the disclosure are discussed below, or elsewhere in the specification, to provide additional guidance to the practitioner regarding the description of the disclosure. For convenience, some terms may be highlighted, for example, using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms may on occasion be used interchangeably.

Consequently, alternative language and synonyms may be used for any one or more of the terms discussed herein, nor is any special significance to be placed upon whether or not a term is elaborated or discussed herein. Synonyms for some terms are provided. A recital of one or more synonyms does not exclude the use of other synonyms. The use of examples anywhere in this specification including examples of any term discussed herein is illustrative only, and is not intended to further limit the scope and meaning of the disclosure or of any exemplified term. Likewise, the disclosure is not limited to various implementations given in this specification.

Those skilled in the art will appreciate that the logic illustrated in each of the flow diagrams discussed above may be altered in various ways. For example, the order of the logic may be rearranged, substeps may be performed in parallel, illustrated logic may be omitted; other logic may be included, etc.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiples of any item such as A and A; B, B, and C; A, A, B, C, and C; etc.

Without intent to further limit the scope of the disclosure, examples of instruments, apparatus, methods and their related results according to the implementations of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

I claim:

1. A computer-readable storage medium storing instructions that, when executed by a computing system, cause the computing system to perform operations comprising:
   detecting a user action when a user interacts with an application displayed on a screen of a device;
   evaluating past events to determine whether a list of current events associated with the user action can be coalesced;
   in response to determining that the user action can be coalesced, coalescing at least two events from the list of current events into a coalesced event in a manner that increases efficiency of processing the user action; and
   executing the coalesced event.

2. The computer-readable storage medium of claim 1, wherein coalescing the at least two events comprises coalescing multiple touchmove events into a single touchmove event.

3. The computer-readable storage medium of claim 1, wherein evaluating the past events comprises:
   determining that the past events can be designated as a coalesced event type; and
   designating the past events as the coalesced event type.

4. The computer-readable storage medium of claim 3, wherein the past events are designated as the coalesced event type on a per application basis.

5. The computer-readable storage medium of claim 1, wherein coalescing the at least two events comprises grouping the at least two events into a predetermined number of sub-groups to optimize processing.

6. The computer-readable storage medium of claim 1, wherein coalescing the at least two events comprises using machine learning techniques to determine an optimum number of coalesced events.

7. A method performed by a computing system having memory and a processor, the method comprising:
   detecting a user action when a user interacts with an application displayed on a screen of a device;
   evaluating past events to determine whether a list of current events associated with the user action can be coalesced;
   in response to determining that the user action can be coalesced, coalescing at least two events from the list of current events into a coalesced event in a manner that increases efficiency of processing the user action; and
   executing the coalesced event.

8. The method of claim 7, wherein coalescing the at least two events comprises coalescing multiple touchmove events into a single touchmove event.

9. The method of claim 7, wherein evaluating the past events comprises:
   determining that the past events can be designated as a coalesced event type; and
   designating the past events as the coalesced event type.

10. The method of claim 9, wherein the past events are designated as the coalesced event type on a per application basis.

11. The method of claim 7, wherein coalescing the at least two events comprises using machine learning techniques to determine an optimum number of coalesced events.

12. The method of claim 7, wherein coalescing the at least two events comprises grouping the at least two events into a predetermined number of sub-groups to optimize processing.

13. The method of claim 7, wherein the coalesced event is based on a predetermined parameter.

14. A system comprising:
   at least one hardware processor coupled to a network; and
   a memory configured to store processor-executable components, wherein the processor-executable components further comprise:
      a component for detecting a user action when a user interacts with an application displayed on a screen of a device;
      a component for evaluating past events to determine whether a list of current events associated with the user action can be coalesced;
      a component for, in response to determining that the user action can be coalesced, coalescing at least two events from the list of current events into a coalesced event in a manner that increases efficiency of processing the user action; and
      a component for executing the coalesced event.

15. The system of claim 14, wherein coalescing the at least two events comprises coalescing multiple touchmove events into a single touchmove event.

16. The system of claim 14, wherein evaluating the past events comprises:
   determining that the past events can be designated as a coalesced event type; and
   designating the past events as the coalesced event type.

17. The system of claim 16, wherein the past events are designated as the coalesced event type on a per application basis.

18. The system of claim 14, wherein coalescing the at least two events comprises grouping the at least two events into a predetermined number of sub-groups to optimize processing.

19. The system of claim 14, wherein coalescing the at least two events comprises using machine learning techniques to determine an optimum number of coalesced events.

20. The system of claim 14, wherein the coalesced event is based on a predetermined parameter.

* * * * *